United States Patent [19]
Kaede

[11] Patent Number: 4,973,124
[45] Date of Patent: Nov. 27, 1990

[54] WAVELENGTH DROP-AND-INSERT DEVICE

[75] Inventor: Kazuhisa Kaede, Tokyo, Japan

[73] Assignee: NEC Corporation, Tokyo, Japan

[21] Appl. No.: 455,024

[22] Filed: Dec. 22, 1989

[30] Foreign Application Priority Data

Dec. 22, 1988 [JP] Japan ................... 63-325196

[51] Int. Cl.$^5$ .......................... G02B 6/26; G02B 6/34; H04J 11/00; G02F 1/00
[52] U.S. Cl. ............................ 350/96.15; 350/96.16; 350/96.19; 350/401; 350/402; 350/404; 350/311; 370/2; 370/3; 455/606; 455/612; 455/616
[58] Field of Search ............... 350/96.10, 96.13, 96.15, 350/96.16, 96.18, 96.19, 96.20, 96.29, 96.30, 374, 394, 395, 401, 402, 404, 311; 455/606, 616, 617, 612; 370/2, 3

[56] References Cited

U.S. PATENT DOCUMENTS

| | | | |
|---|---|---|---|
| 3,501,640 | 3/1970 | Harris | 370/2 X |
| 4,449,782 | 5/1984 | Korth | 350/96.16 |
| 4,492,426 | 1/1985 | Nicia et al. | 350/96.15 |
| 4,566,761 | 1/1986 | Carlsen et al. | 370/2 X |
| 4,584,470 | 4/1986 | Iizuka et al. | 350/96.30 X |
| 4,633,170 | 12/1986 | Burns | 350/96.15 |
| 4,673,270 | 6/1987 | Gordon | 350/96.15 |
| 4,685,773 | 8/1987 | Carlsen et al. | 370/2 X |
| 4,746,191 | 5/1988 | Kawakami et al. | 350/96.29 |
| 4,776,669 | 10/1988 | Dammann et al. | 350/96.19 X |
| 4,800,556 | 1/1989 | Charlier et al. | 370/3 |
| 4,805,977 | 2/1989 | Tamura et al. | 350/96.16 |
| 4,861,136 | 8/1989 | Stone et al. | 350/96.30 |
| 4,889,404 | 12/1989 | Bhagavatula et al. | 350/96.16 |

FOREIGN PATENT DOCUMENTS

| | | | |
|---|---|---|---|
| 54-157003 | 12/1979 | Japan | 370/2 X |
| 61-223822 | 10/1986 | Japan | 370/2 X |
| 63-167533 | 7/1988 | Japan | 370/2 X |
| 64-23221 | 1/1989 | Japan | 370/2 X |
| 2098353 | 11/1982 | United Kingdom | 350/96.19 X |

OTHER PUBLICATIONS

R. Kazarinov et al, "Narrow-Band Resonant Optical Reflectors and Resonant Optical Transformers for Laser . . . Multiplexing", IEEE Journal of Quantum Elec., vol. QE-23, No. 9, Sep. 1987, pp. 1419-1425.

R. J. Deri et al, "GaAs/AlGaAs Integrated-Optical Wavelength Demultiplexer", Optics Letters, vol. 13, No. 11, Nov. 1988, pp. 1047-1049.

K. O. Hill et al, "Photosensitivity in Optical Fiver Waveguides: . . . Fabrication", Appl. Phys. Lett., vol. 32, No. 10, May 15, 1978, pp. 647-649.

D. C. Johnson et al, "New Design Concept for a Narrowband Wavelength-Selective Optical Tap and Combiner", Electronics Letters, vol. 23, No. 13, Jun. 18, 1987, pp. 668-669.

*Primary Examiner*—Brian Healy
*Attorney, Agent, or Firm*—Sughrue, Mion, Zinn, Macpeak & Seas

[57] ABSTRACT

The invention relates to an optical wavelength drop-and-insert device including two sets of input/output optical fibers attached to two terminals on each of a first and second polarization beam splitter. The first polarization beam splitter splits incoming light into two linearly orthogonal polarizations which are transmitted via a first and second polarization preserving fiber through a first and second quarter wave plate for changing the subject beams into circular polarization. An optical filter is included to transmit or reflect light from the quarter wave plates according to a wavelength based transmission/reflection characteristic. The second polarization beam splitter then acts as a combiner for the circularly polarized light which is received via a third and fourth polarization preserving fibers and then is transmitted via an output optical fiber. The second polarization beam splitter splits incoming light into two orthgonal polarizations via an incoming optical fiber for two way operation. A second embodiment of the invention uses a first and second optical filter which can be a Fabry Perot or Bragg diffraction grating type optical fiber.

4 Claims, 4 Drawing Sheets

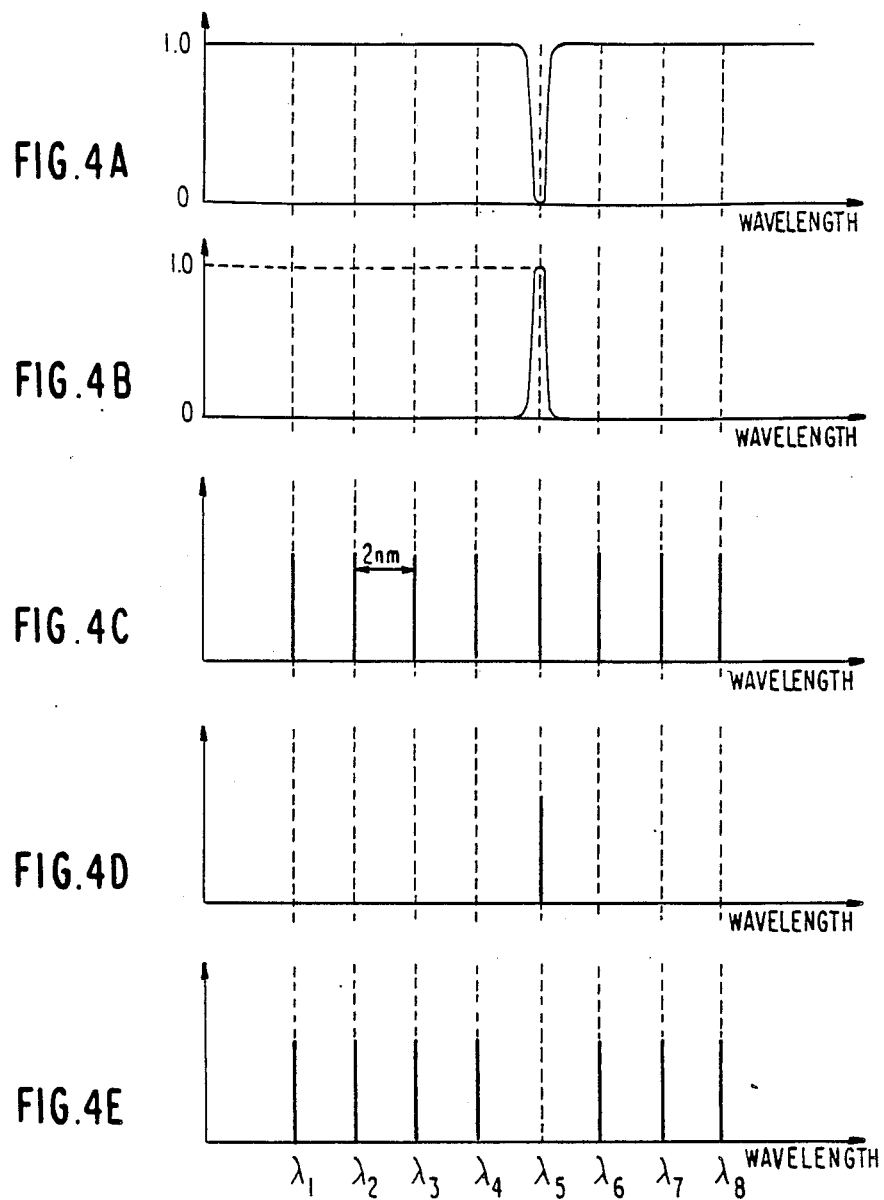

WAVELENGTH DROP-AND-INSERT DEVICE

BACKGROUND OF THE INVENTION

The present invention relates to a wavelength drop-and-insert device applicable to, but not limited to, optical communication for dropping and/or inserting a part of a group of discrete wavelengths.

A prerequisite with an optical communications network is that the frequency range of light be effectively used by dropping and/or inserting, among a great number of optical frequency signals, a signal having a particular frequency. A wavelength drop-and-insert device for meeting such a requirement has been reported by D. C. Johnson et al. in a paper entitled "New design concept for a narrowband wavelength-selective optical tap and combiner", Electronics Letters, Vol. 23, No. 13, pp. 668-669, 1987. The wavelength drop-and-insert device disclosed in this paper is a Mach-Zehnder interference type device having a first 3 dB directional coupler for splitting an input optical signal into two beams which propagate through independent optical paths by the same power, and a second 3 dB directional coupler for recombining two beams. Specifically, the second 3 dB directional coupler causes the two beams propagated through the two optical paths to interfere with each other and then outputs them via a terminal other than an input terminal. A problem is, therefore, the relationship in phase between the two beams incident to the second 3 dB directional coupler from the individual optical paths is susceptible to a change in the ambient temperature as small as 0.01° C. to 0.1° C., resulting in the drop-/insert terminals of the device replacing each other.

Further, the prior art device of the type described causes the two beams from the individual optical paths to interfere with each other at the second 3 dB directional coupler and, therefore, has to bring the states of polarization thereof into coincidence within the 3 dB directional coupler. Generally, however, the state of polarization of light propagating through a transmission path is apt to change due to a change in the double refractive index or birefringence of the transmission path which is in turn ascribable to externally derived mechanical vibrations and pressures as well as varying ambient temperature. Thus, the polarized states of the two beams in the 3 dB directional coupler will not coincide with each other. Use may be made of a polarization preserving fiber in order to stabilize the polarized state on the optical path and to thereby maintain the polarized state constant. In practice, however, it is only a truly circular fiber or the like free from double refraction that can transmit light while maintaining a desired oval polarization as distinguished from a linear polarization. Such an implementation is extremely difficult to achieve. In this connection, even if a truly circular fiber is used, it is apt to have double refractivity when subjected even to an unnoticeable temperature variation, mechanical pressure or vibration, resulting in the polarized state of light being unstable. The difficulty in transmitting a desired polarized state stably directly translates into a difficulty in insuring stable operations with a desired polarized state (i.e. desired oval polarization). Consequently, the intensity of interference of the two beams in the 3 dB directional coupler changes to bring about various undesirable occurrences such as the leakage of light to an unexpected terminal of the device.

SUMMARY OF THE INVENTION

It is therefore an object of the present invention to provide a wavelength drop-and-insert device which operates stably without being effected by changes in environmental conditions.

It is another of the present invention to provide a wavelength drop-and-insert device of a type different from the Mach-Zehnder type in which drop/insert terminals are determined by the interference of light propagated through individual optical paths.

A wavelength drop-and-insert devide of the present invention includes a first optical fiber and a first polarization beam splitter. The first polarization beam splitter receives light coming in over a first optical fiber at a first terminal, splits the light into linearly polarized beams which are in two orthogonal polarizations, outputs the polarized beams via a second and a third terminal, combines linearly polarized orthogonal beams coming in through the second and third terminals, and outputs the combined polarized beams via a fourth terminal. A second optical fiber propagates the combined polarized beams incident to the fourth terminal of the first polarization beam splitter. A first and a second polarization preserving fiber propagate respectively the beams emerging from the second and third terminals of the first polarization beam splitter while maintaining the states of polarization of the beams. A first and a second quarter-wave plate transmit respectively the beams issuing from the first and second polarization preserving fibers to subject the beams to circular polarization. An optical filter transmits or reflects the beams transmitted through the quarter-wave plates according to a wavelength-based transmission/reflection characteristic. A third and a fourth quarter-wave plate transmit the beams propagated through the first and second polarization preserving fibers and transmitted through the optical filter in order to transform the circular polarization to orthogonal linear polarization. A third and a fourth polarization preserving fiber propagate respectively the beams propagated through the first and second polarization preserving fibers and the third and fourth quarter-wave plates while preserving states of polarization of the beams. A second polarization beam splitter receives the beams emerging from the third and fourth polarization preserving fibers at the second and third terminals, respectively, combines the beams received at the second and third terminals, couples the combined beams to a fourth optical fiber via a fourth terminal, receives light coming in over a third optical fiber at a first terminal, splits the light received at the first terminal into linearly polarized beams which are in two orthogonal polarizations, and outputs the two polarized beams via the second and third terminals which are optically coupled to the third and fourth polarization preserving fibers, respectively.

The present invention drops and/or inserts a wavelength by splitting light into polarized orthogonal beams and combines beams propagated through two optical paths without using the interference of beams which is particular to the prior art Mach-Zehnder type scheme. The output terminals are, therefore, operable stably without being effected by varying ambient temperature, mechanical vibrations, etc.

Wavelength-multiplexed light or optical signal is propagated through the first optical fiber to reach the first terminal of the first polarization beam splitter and thereby split into beams which are in two orthogonal polarizations. The beams are subjected to circular polarization at the first and second quarter-wave plates. The resulting beams in the circular polarization are applied to the optical fiber to turn into transmitted beams and reflected beams. The transmitted beams are routed to the fourth optical fiber as dropped beams, while the reflected beams are routed to the second optical fiber. Specifically, the beams reflected by the optical filter are reconverted from the circular polarization to the linear polarization by the first and second quarter-wave plates and then returned to the first polarization beam splitter. At this stage, the linear polarizations are individually orthogonal to the previous polarizations. Hence, when the polarized orthogonal beams are combined by the first polarization beam splitter and outputted via the fourth terminal of the latter, they have been reversed with respect to transmission and reflection. As a result, the combined beams exit the fourth terminal. On the other hand, the beams transmitted through the optical filter are reconverted from the circular polarization to the linear polarization by the third and fourth quarter-wave plates, combined by the second polarization beam splitter, and then outputted via the fourth terminal of the second polarization beam splitter. These beams incident to the second and third terminals of the second polarization beam splitter are individual orthogonal in polarization to beams which the second polarization beam splitter outputs via its second and third terminals by splitting light incident to the first terminal thereof. Light incident to the first terminal of the second polarization beam splitter to be inserted and having the same wavelength as the beams which are transmitted through the optical filter is transmitted through the optical filter and then guided to the first terminal of the first polarization beam splitter. Therefore, this light is combined with the light having been reflected by the optical filter and then outputted via the fourth terminal of the first polarization beam splitter. More specifically, the optical signal incident to the first terminal of the second polarization beam splitter and having a wavelength which the optical filter transmits is inserted in the group of wavelengths which are to be outputted via the fourth terminal of the first polarization beam splitter.

Since the first and second polarization beam splitters individually combine polarized orthogonal beams without resorting to the mutual interference of the beams, the combining function is immune to a change in the relative phase of the beams. The device is, therefore, generally not susceptible to a change in the optical path length ascribable to a change in the refractive index of a signal transmitting medium which is in turn ascribable to the varying ambient temperature, mechanical vibration, etc., thereby achieving extremely stable operations. This is also true with a case wherein light incident to the first terminal of the second polarization beam splitter is combined with light incident to the first terminal of the first polarization beam splitter and then outputted via the fourth terminal of the first beam splitter.

In accordance with the present invention, wavelengths are dropped and/or inserted by spliting light into beams which are in two orthogonal polarizations. Hence, the states of polarization can be maintained constant after the polarization by using polarization preserving fibers, for example. Specifically, P- and S-polarized beams are maintained in their particular polarizations and prevented from being turned to other polarizations. All that is required is, therefore, combining P- and S-waves at all times and with no regard to their intensities. This eliminates a change in the states of polarization otherwise caused within the device due to a change in ambient temperature, mechanical vibration and pressure.

The present invention used both of the beams which are produced by the first polarization beam splitter, i.e., it does not discard any of them. This, of course, is to output the entire optical signal power with no regard to the states of polarization of an optical signal which enters the device. Hence, combining and outputting the two kinds of beams is successful in preventing the output power from being changed despite any change in the state of polarization of the incoming light.

BRIEF DESCRIPTION OF THE DRAWINGS

The above and other objects, features and advantages of the present invention will become more apparent from the following detailed description taken with the accompanying drawings in which;

FIGS. 4A and 4B are charts showing respectively the transmittance and reflectance of a Bragg diffraction grating type optical filter; FIG. 4C is a chart representative of the spectrum of an optical signal carrying eight multiplexed wavelengths and propagating through one of the optical fibers shown in FIG. 3;

FIG. 4D is a chart showing the spectrum of light outputted to another optical fiber shown in FIG. 3; and FIG. 4E is a chart showing the spectrum of light outputted to still another optical fiber shown in FIG. 3.

DETAILED DESCRIPTION OF THE PREFERRED EMBODIMENTS

Figure 1:
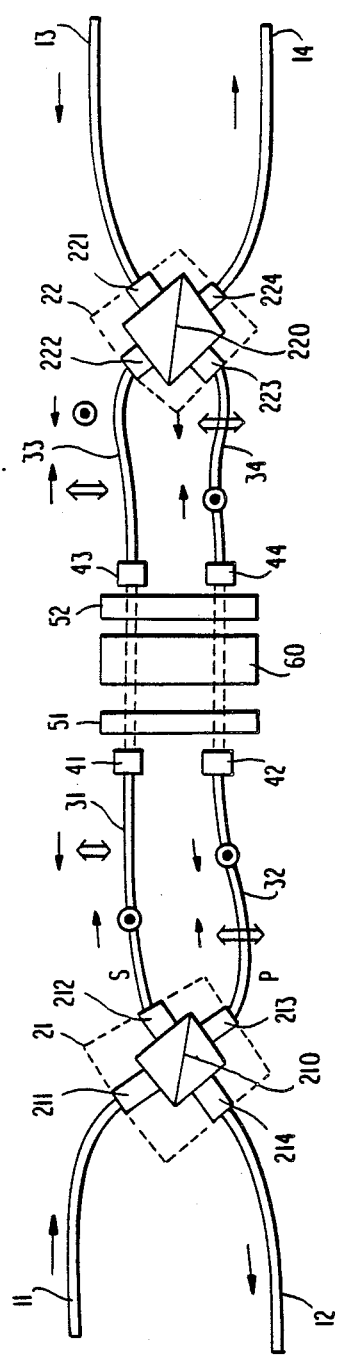
FIG. 1 is a schematic view of a wavelength drop-and-insert device embodying the present invention.

Referring to FIG. 1 of the drawings, a wavelength drop-and-insert device embodying the present invention is shown. As shown, the device has a first and a second polarization beam splitter 21 and 22, a first to a fourth polarization preserving fiber 31 to 34, a Fabry Perot optical filter 60, and a first and a second quarter-wave plate 51 and 52. The components other than the filter 60 are arranged in a symmetrical configuration with respect to the filter 60.

The polarization beam spliter 21 (22) has four inlets/outlets 211 to 214 (221 to 224) and splits light incident to any one of them into beams which are in two orthogonal polarizations. The polarized beams exit the polarization beam splitter 21 (22) through the other inlets/outlets. Optical fibers 11 and 12 (13 and 14) are interconnected to the first and fourth inelts/outlets 211 and 214 (221 and 224), respectively. The polarization preserving fibers 31 and 32 (33 and 34) are interconnected to the second and third inlets/outlets 212 and 213 (222 and 223), respectively. Lenses 41 and 42 (43 and 44) are fitted on the tips of the polarization preserving fibers 31 and 32 (43 and 44), respectively. The "inlets/outlets" of the polarization beam splitters 21 and 22 will hereinafter be used interchangeably with "terminals".

In FIG. 1, light or optical signal carrying eight discrete wavelengths which were multiplexed at intervals of 2 nm in the 1.55 μm wavelength region is incident to the first terminal 211 of the first polarization beam splitter 21 via the first optical fiber 11. The beam splitter 21 splits the incident light into S-polarized beams (polarization perpendicular to the sheet surface of FIG. 1) and P-polarized beams (polarization parallel to the same). The S- and P-polarized beams are outputted through the second and third terminals 212 and 213, respectively. These beams are individually coupled to the first and second polarization preserving fibers 31 and 32 such that their directions of polarization coincide with either one of two main axes of the associated fibers 31 and 32. All the terminals 211 to 214 of the polarization beam splitter 21 are implemented as lenses. The S- and P-polarized beams propagated through the fibers 31 and 32, repectively, are transformed into parallel beams by the collimating lenses 41 and 42, respectively. The parallel beams which emerge from the lenses 41 and 42 are converted into circular polarization by the quarter-wave plate 51 and are then incident to the Fabry Perot optical filter 60.

Figure 2A:
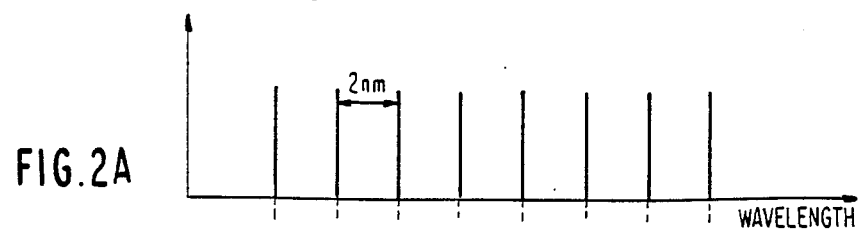
FIG. 2A is a chart showing a wavelength-multiplexed optical signal which may be propagated through an optical fiber to the device shown in FIG. 1.
Figure 2B:
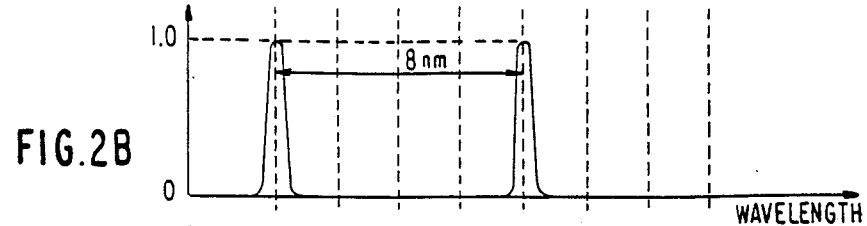
FIGS. 2B and 2C are charts showing respectively the transmittance and reflectance of a Fabry Perot Optical filter.
Figure 2C:
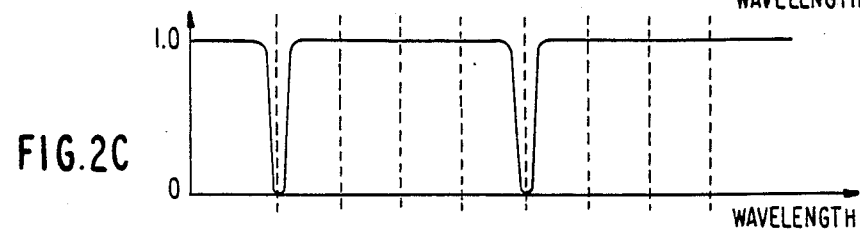
Figure 2D:
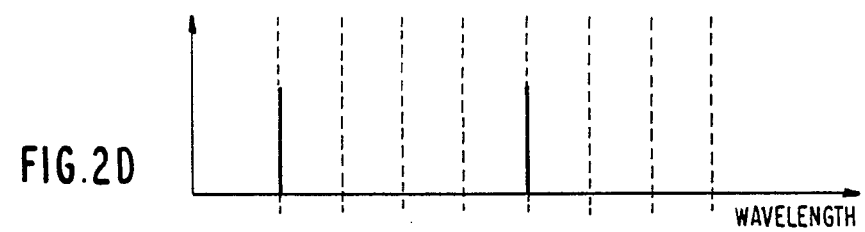
FIGS. 2D and 2E are charts showing respectively the spectra of optical signals which are outputted to independent optical fibers as shown in FIG. 1.
Figure 2E:
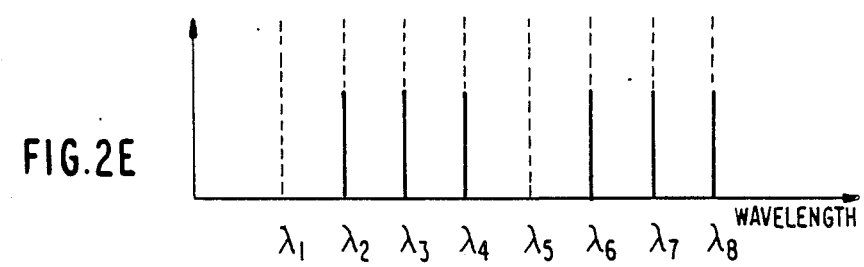

As shown in FIG. 2A, the incoming optical signal has eight different wavelengths multiplexed at the intervals of 2 nm in the 1.55 μm wavelength region. On the other hand, the Fabry Perot filter 60 has a free spectral range of 8 nm, finesse of about 300, and transmission/reflection characteristic as shown in FIGS. 2B and 2C. Hence, the two wavelengths shown in FIG. 2D are transmitted through the optical filter 60, while the other six wavelengths shown in FIG. 2E are reflected by the filter 60.

The polarization beam splitter 21 has a polarization beam splitting filter 210 which is made up of two glass blocks which enclose a dielectric multi-layer filter. The two glass blocks are produced by dividing a cube in a plane which contains two outer sides of the cube. The dielectric multi-layer filter is positioned in the plane of division, i.e., it is formed on at least either one of the surfaces of the two glass blocks which face each other in the plane of division.

Among the beams exited by the lenses 41 and 42, six beams (FIG. 2E) reflected by the optical filter 60 are again transmitted through the quarter-wave plate 51 to be coupled to the polarization preserving fibers 31 and 32. The beams propagating through the fibers 31 and 32 this time, i.e., the beams propagated back and forth once through the quarter-wave plate 51 are in polarizations orthogonal to their previous polarizations. Specifically, the P- and S-polarized beams propagate through the fibers 31 and 32, respectively. The S-polarized beams are reflected by the polarization beam splitting filter 210, while the P-polarized beams are transmitted therethrough. Consequently, these beams from the optical filter 60 are recombined by the polarization beam splitter 21 and then outputted to optical fiber 12 via the terminal 214.

On the other hand, the beams transmitted through the optical filter 60 (FIG. 2D) are passed through the second quarter-wave plate 52 and then through the third and fourth lenses 43 and 44 to be coupled to the third and fourth polarization preserving filbers 33 and 34. The beams propagated through the two successive quarter-wave plates 41 and 43 and coupled to the fiber 33 have been reversed from S-polarization to P-polarization by the successive quarter-wave plates 41 and 43. Likewise, the beams propagated through the second polarization preserving fiber 32 and coupled to the fourth polarization preserving fiber 34 have been reversed from P-polarization to S-polarization. Consequently, the beams incident in P-polarization to the second terminal 222 of the second polarization beam splitter 22 via the third fiber are transmitted through the second polarization beam splitting filter 220 and then outputted via the fourth terminal 224. Likewise, the beams incident in S-polarization to third terminal 223 of the polarization beam splitter 22 via the fourth fiber 34 are reflected by the filter 220 and then outputted via the fourth terminal 224. In this manner, the beams transmitted through the optical filter 20 issue from the terminal 224 of the polarization beam splitter 22 without exception. The terminals 221 to 224 of the second polarization beam splitter 22, like the terminals of the first beam splitter 21, are implemented as lenses. The beams propagated through the third and fourth polarization preserving fibers 33 and 34, respectively, are orthogonal to each other with respect to polarization and, therefore, they do not interfere with each other when recombined by the second polarization beam splitter 22. In this manner, among the wavelengths $\lambda_1$ to $\lambda_8$ which come in through the optical fiber 11, the wavelengths $\lambda_1$ and $\lambda_5$ exit to the fourth optical fiber 14 while the wavelengths $\lambda_2$, $\lambda_3$, $\lambda_4$, $\lambda_6$, $\lambda_7$ and $\lambda_8$ exit to the second optical fiber 12. This allows particular wavelengths to be separated from one another.

Assuming that an optical signal carrying wavelengths shown in FIG. 2D and an optical signal carrying wavelengths shown in FIG. 2E come in over the third optical fiber 13 and the first optical fiber 11, respectively. Then, these optical signals are combined and outputted via the fourth terminal 214 of the first polarization beam splitter 21. Likewise, when an optical signal having wavelengths shown in FIG. 2E and an optical signal having wavelengths shown in FIG. 2D are incident to the first terminal 221 of the second polarization beam splitter 22 and the optical fiber 11, respectively, they will be combined and outputted via the fourth terminal 224 of the beam splitter 22. This will be clearly understood from the the drop-and-insert configuration depicted in FIG. 1 which is symmetrical with respect to the Fabry Perot optical filter 60.

The embodiment shown and described has various unprecedented advatages. For example, the use of a Fabry Perot optical filter allows, among beams which are arranged at predetermined wavelength intervals, a plurality of beams to be dropped or inserted as a unit. Wavelengths can be dropped or inserted not only with the beams arranged at the intervals of the order of several nm as shown and described but also with beams which are arranged at the intervals of the order of 0.01 nm.

Figure 3:
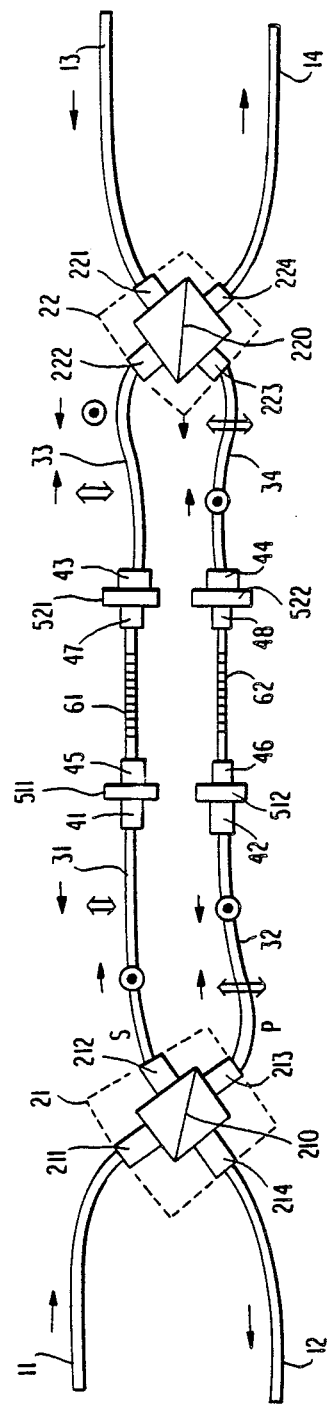
FIG. 3 is a schematic view representative of an alternative embodiment of the present invention.

Referring to FIG. 3, an alternative embodiment of the wavelength drop-and-insert device in accordance with the present invention is shown. In the figures, the same components and structural elements are designated by like reference numerals, and redundant description will be avoided for simplicity. FIGS. 4A to 4E are charts useful for understanding the function of the device shown in FIG. 3. The embodiment of FIG. 3 differs from the embodiment of FIG. 1 in that it has Bragg diffraction grating type optical filters 61 and 62 in place of the Fabry Perot optical filter 60. The rest of the construction is exactly the same as the construction shown in FIG. 1. As FIGS. 4A and 4B indicate, the Bragg diffraction grating type optical filters 61 and 62 are reflective only for the Bragg wavelength and its neighborhood and is transmissive for the other wavelengths. Hence, among eight different beams each having a different wavelength (FIG. 4C) incident to the first terminal of the first polarization beam splitter 21, only the beam whose wavelength corresponds to the Bragg wavelength (FIG. 4D) exist the fourth terminal 211 of the first polarization beam splitter 21, while the other seven beams (FIG. 4E) exit the fourth terminal 224 of the second polarization beam splitter 22. Each of the filters 61 and 62 are implemented as a fiber-like Bragg diffraction grating type optical filter by subjecting a Ge-doped silica core fiber to interference exposure which uses an Ar laser beam whose wavelength is 50 nm or so and thereby generating a periodic variation in refractive index. The filters 61 and 62 are substantially 1 meter long each.

When an optical signal having wavelengths shown in FIG. 4E is incident to the first terminal 221 of the second polarization beam splitter 22, it is combined with an optical signal having a wavelength shown in FIG. 4D and incident to the first terminal 211 of the first polarization beam splitter 21. The combined wavelengths emerge from the fourth terminal 214 of the beam splitter 21. Further, when the optical signal having the wavelength as shown in FIG. 4D is incident to the first terminal 221 of the beam splitter 22, it is combined with the optical signal having the wavelengths of FIG. 4E and incident to the terminal 211 of the beam splitter 21 and then outputted via the fourth terminal 224 of the beam splitter 22.

For details of the procedure for fabricating a Bragg diffraction grating type optical filter, a reference may be made to K. O. Hill et al. "photosensitivity in optical fiber waveguides: application to reflection filter fabrication", Applied Physics Letters, Vol. 32, pp. 647–649, 1978.

An advatage attainable with the alternative embodiment described above is that only a beam whose wavelength corresponds to the Bragg wavelength can be selected out of a plurality of beams having different wavelengths and dropped and/or inserted.

In summary, it will be seen that the present invention provides a wavelength drop-and-insert device capable of dropping and/or inserting only a part of a plurality of beams having discrete wavelengths. The device can be configured in matching relation to a particular wavelength interval which may range from 0.01 nm order to serveral nm order. Since the device drops and/or inserts wavelengths by splitting and optical signal into beams which are in two polarizations orthogonal to each other, they can be combined without resorting to an interference effect. The device is, therefore, generally not susceptible to a change in the optical path length ascribable to a change in the refractive index of a beam transmitting medium which is in turn ascribable to variations in ambient temperature, mechanical vibrations, etc.

What is claimed is:

1. A wavelength drop-and-insert device comprising:
a first optical fiber;
a first polarization beam splitter for receiving light coming in over a first optical fiber at a first terminal, splitting said light into linearly polarized beams which are in two orthogonal polarizations, outputting said linearly polarized beams via a second and a third terminal, combining linearly polarized beams coming in through said second and third terminals in two orthogonal polarizations, and outputting said combined polarized beams via a fourth terminal;
a second optical fiber for propagating said combined polarized beams incident to said fourth terminal of said first polarization beam splitter;
a first and a second polarization preserving fiber for propagating respectively said beams emerging from said second and third terminals of said first polarization beam splitter while maintaining states of polarization of said beams;
a first and second quarter-wave plate for transmitting respectively said beams issuing from said first and second polarization preserving fibers to subject said beams to circular polarization;
an optical filter for transmitting or reflecting said beams transmitted through said quarter-wave plates according to a wavelength-based transmission/reflection characteristic;
a third and a fourth quarter-wave plate for transmitting said beams propagated through said first and second polarization preserving fibers and transmitted through said optical filter in order to transform said circular polarization to orthogonal linear polarization;
a third and a fourth polarization preserving fiber for propagating respectively said beams propagated through said first and second polarization preserving fibers and said third and fourth quarter-wave plates while preserving states of polarization of said beams; and
a second polarization beam splitter for receiving said beams emerging from said third and fourth polarization preserving fibers at a second and third terminal, respectively, combining said beams received at said second and third terminals, coupling said combined beams to a fourth optical fiber via a fourth terminal, receiving light coming in over a third optical fiber at a first terminal, splitting said light received at said first terminal into linearly polarized beams which are in two orthogonal polarizations, and outputting said polarized beams via said second and third terminals which are optically coupled to said third and fourth polarization preserving fibers, respectively.

2. A wavelength drop-and-insert device comprising:
first polarization beam splitting/combining means having a first to a fourth inlet/outlet for splitting light into linearly polarized beams which are in two orthogonal polarizations, conducting said polarized beams to said second and third inlets/outlets, and combining beams which are incident to said second and third inlets/outlets;
a first and a second polarization preserving fiber optically coupled to said second and third inlets/outles, respectively, for guiding said beams while preserving states of polarization of said beams;
a first and a second quarter-wave plate optically coupled to said first and second polarization preserving fibers, respectively;
first and second optical filter means optically coupled to said first and second quarter-wave plates, respectively, and each having a narrowband wavelength-selective characteristic;

a third and fourth quarter-wave plate optically coupled to said first and second optical filter means, respectively;

a third and a fourth polarization preserving fiber optically coupled to said third and fourth quarter-wave plates, respectively, for guiding beams while maintaining states of polarization of said beams; and a second polarization beam splitting/combining means having a first and a second inlet/outlet optically coupled respectively to said third and fourth polarization preserving fibers, a third inlet/outlet, and a fourth inlet/outlet, said second polarization beam splitting/combining means combining polarized orthogonal beams incident to said first and second inlets/outlets, conducting said combined polarized beams to said third inlet/outlet, and splitting light incident to said fourth inlet/outlet into linearly polarized beams which are orthogonal to each other.

3. A device as claimed in claim 2, wherein said first and second optical filter means comprise a Fabry Perot optical filter each.

4. A device as claimed in claim 2, wherein said first and second optical filter means comprise a Bragg diffraction grating type optical filter each.

* * * * *

UNITED STATES PATENT AND TRADEMARK OFFICE
CERTIFICATE OF CORRECTION

PATENT NO. : 4,973,124
DATED : November 27, 1990
INVENTOR(S) : Kazuhisa KAEDE

It is certified that error appears in the above-identified patent and that said Letters Patent is hereby corrected as shown below:

Column 2, line 12, delete "devide", and insert --device--.

Column 3, line 60, delete "spliting", and insert --splitting--.

Column 4, line 56, delete "spliter", and insert --splitter--;

Column 4, line 62, delete "inelts", and insert --inlets--.

Column 5, line 65, delete "filbers", and insert --fibers--.

Column 7, line 40, delete "advatage", and insert --advantage--.

Signed and Sealed this

Twenty-second Day of September, 1992

Attest:

DOUGLAS B. COMER

*Attesting Officer*    *Acting Commissioner of Patents and Trademarks*